July 19, 1938.  H. J. MURRAY  2,124,076

COMBINED STARTING, SYNCHRONIZING, AND SHIFTING SYSTEM

Filed Jan. 19, 1937  3 Sheets-Sheet 1

INVENTOR

Howard J. Murray.

July 19, 1938.  H. J. MURRAY  2,124,076
COMBINED STARTING, SYNCHRONIZING, AND SHIFTING SYSTEM
Filed Jan. 19, 1937  3 Sheets-Sheet 3

INVENTOR
Howard J. Murray

Patented July 19, 1938

2,124,076

UNITED STATES PATENT OFFICE 2,124,076

COMBINED STARTING, SYNCHRONIZING, AND SHIFTING SYSTEM

Howard J. Murray, New York, N. Y.

Application January 19, 1937, Serial No. 121,270

24 Claims. (Cl. 290—28)

The present disclosure relates in general to an improved organization of power elements for actuating a gear synchronizing and shifting mechanism and specifically relates to an improvement in the speed control parts of an automotive self-starter power plant.

One of the objects of the present invention is to provide a simple and positively actuated means for synchronizing and shifting the gear sets of an automotive power transmission economically and in properly timed sequence to the functioning of correlated mechanism such as the vehicle engine foot clutch.

In my Patent #1,268,267 it is suggested that the different selective speed gear combinations be selectively synchronized and controlled by manual selection and actuated from some suitable power member such as a magnetically actuated shaft.

Where economy in construction is paramount it is impractical to provide a separate power plant for actuating the gear synchronizing and shifting mechanism and recourse must be had to such power supplying elements as are already present in the known automobile power plants.

The present disclosure is a development of the invention disclosed in my Patent #1,478,243 issued Dec. 18th, 1923 titled "Combined motor starter and gear shifter". The method of controlling conventional starting motors has improved since 1923 and most makes of cars now on the market are equipped with some form of co-incidentally or automatically controlled self-starter for the vehicle engine and this mechanism may be modified to provide a convenient and inexpensive source of synchronizing and shifting power.

In addition the present disclosure contemplates the use of a conventional blocker type of gear synchronizer to be selectively actuated by the conventional starting motor when controlled so as to rotate in a direction opposite to its direction of rotation when employed as a starting motor.

Thus with sufficient self-starter power available the deterrent elements of the transmission synchronizing mechanism may be provided so as to be more positive. The active power transferring portions of the synchronizing mechanism such as the friction synchronizing surfaces in the friction type of synchronizer may be provided to act at a greater power transfer capacity.

In this event the synchronizing interval for a given set of transmission synchronizing conditions may be relatively decreased, and such decrease would result in a speeding up of the gear shifting action. The use of the starting motor as a source of synchronizing and gear shifting power would also permit greater available forces to be applied for synchronizing than is at present practical through the conventional manually actuated gear shift lever as used on the blocker type synchronized power transmissions.

The present invention therefore primarily contemplates the utilization of such conventional co-incidentally or automatically controlled self-starters modified for supplying the power necessary to unidirectionally effect the desired synchronizing and shifting of the speed controlling gears. These self-starters are usually of the high speed high torque type of electric motors and include some means for moving its driving power element into driving engagement with some rotatable element of the engine to start the same. It is usual to employ the starting motor to run idle in one direction and until it acquires a speed sufficient to act as a starting motor and thus "fire the engine". Transmission gear can be synchronized and shifted rapidly by the starting motor and still require relatively little power compared to the power required to turn over the engine.

Accordingly the present invention in its refinement of application to automotive construction includes a unidirectional connection between the self-starter motor and the gear synchronizing and shifting mechanism which will be operative during the period the said motor is rotating at relatively slower speeds in one direction and which will automatically become inoperative as a synchronizing and shifting motor prior to the time when the motor is controlled to assume its load as a starting motor at relatively high speed and torque when rotating in the opposite direction.

Stated differently, an object of the present invention is to provide a single power plant which when set in operation will supply the necessary power to actuate a gear synchronizing and shifting mechanism as it rotates in one direction and will also supply the necessary power to start the engine as the said plant is controlled to rotate in the opposite direction.

Another object of the present invention is to provide a control for the starting motor which when set in operative position will affect the supply of current to the motor to cause the said motor to function to an extent to synchronize and shift the transmission gears preferably at low speeds in one direction of rotation and which control will become inoperative when other superseding current supply controls are actuated to cause the said motor to rotate at relatively high speeds in the opposite direction to act to couple the said motor to the engine starting mechanism.

This starting motor reversing phase of the present invention is attained in the illustrated disclosure by providing two motor current supply switches for controlling and directing the current supply to the starting motor so as to actuate the motor at relatively slow speed in one direction and at relatively high speed in the opposite direction. One of the switches is arranged to be superseded by the other switch and to be normally opened and closed as a co-incidental function of the manual operation of the conventional engine foot-clutch when it is desired to synchronize and shift or neutralize a selected transmission gear. The other switch constitutes a modified conventional starting motor control arranged to meet the peculiar requirements of the starting system with which the present disclosed device is installed and operated.

This other switch is arranged to supersede at all times the current supply action of the first mentioned switch, so that the said motor may be employed as a starting motor independently of the status of the first mentioned switch.

Still another object of the present invention is to provide a safety controlling device for selectively actuating one of a plurality of gear controlling mechanisms in proper operative sequence from a single manually operative interlocked synchronizing and shifting control station and particularly relates to the electrically controlled engine starting means and manually selected power operated means for moving the gear shift rods, for selectively synchronizing and shifting the gears controlling the selective speed relations in power transmission devices, and also for holding the gears in their shifted or neutral positions.

A further object of the present invention is to provide a simple form of mechanism which will positively synchronize and thence move the desired gear into an operative position and operatively hold the shifted gear in its operative position by the selective manual operation of a remotely positioned lever at the control station and which will subsequently act to automatically return the shifted gear to its neutral position either by the neutralizing of the said remote manually actuated control lever or by any accident which might happen to the selective controlling mechanism.

A still further object of the present disclosure when considered in connection with its application to a gear synchronizing and shifting device is to provide means so as to synchronize and shift the gears without any definite requirements as to angular rotation of the mechanism elements or any locking tension on the gears either at neutral or in a shifted position other than the conventional resistance of the synchronizer detent and blocker elements.

An additional object of the present disclosure is to provide means constituting a synchronizing and shifting device of the above indicated character which is designed to be unidirectionally coupled either momentarily or continuously with any rotating power element as a co-incidental function of the manual operation of the engine clutch.

I attain these objects broadly by providing two cammed discs rotating about a common axis and one or more synchronizing and gear shifting control rod portions positioned between the discs, each rod provided with one or more remotely controlled selectors, a movable portion of which is arranged to be selectively projected toward and into engagement with one of the discs (hereinafter referred to as the synchronizing disc) upon the selective manual operation of an associated remotely positioned interlocked control lever to an operative position, the selector portion being movable toward and into engagement with the other disc (hereinafter referrred to as the neutralizing disc) when the control lever is moved to a neutral position. The interlock mechanism of the manually actuated control lever is similar to the conventional interlock of the transmission upon which the present device is installed and operated, and thus the synchronizing and shifting action of the device will faithfully follow the manual operation of the manually actuated lever. No gear can be synchronized or shifted unless all the other gears are in neutral position.

One of the said discs is provided with a cam throw designed to move the rods in one direction when engaged by the movable selector portion and the other disc is provided with a cam throw oppositely disposed, and designed to move the rods in an opposite direction when engaged by the movable selector portion.

Thus with two selectors positioned on each rod and symmetrically disposed relative to the common axis of the said discs the rods may each be moved in two directions to and from a neutral position.

One of the discs is thus a common synchronizing and shifting member and the other disc a common neutralizing member. The neutralizing disc is so formed for engagement with the movable selector portion that the remotely positioned manually actuated selective control lever cannot be returned to neutral position until the previously selected gear has been returned to its neutral position.

Thus one gear cannot be synchronized and shifted to an engagement with a mating gear until all the other shiftable gears are actually in neutral position.

The remotely positioned manually actuated control lever as hereinafter stated is provided with an interlock mechanism similar to the conventional interlock mechanism of the conventional transmission employed with the present device and thus the remotely positioned manually actuated control lever motors are similar to that of the conventional shift lever as commonly used in automobile construction. As the synchronizing and shifting of the gears is dependent on the manual operation of the foot operated engine clutch it is obvious that the method of obtaining speed changes with the present device will also be similar to the conventional method except that the selection will be performed by the hand in place of the conventional shift lever, and that no shift lever will be required.

The actuating shaft upon which the shifting and neutralizing discs are mounted for rotation is unidirectionally connected in a resilient manner to the conventional starting motor so that the said disc shaft will only be rotated when the said starting motor is rotated in a direction opposite to its rotating direction when normally acting to start the engine.

The control of the supply current to the starting motor and thus its resultant rotational direction including its reversing action to automatically change the said motor from a starting motor to a synchronizing and shifting motor may be effected as a co-incidental function of the operation of the conventional foot clutch and an associated normally open switch controlling the supply of current to the motor at all times when the motor is not being used as a starting motor, and thus the synchronizing and neutralizing discs will not be rotated when the foot clutch is "in".

According to the present disclosure it is further contemplated to employ a conventional automatically controlled starting motor and a modified conventional automatic control device so that the connections at the automatic device for utilizing the starting motor as a synchronizing and shifting motor will be normally closed but the circuit will be normally open at the foot clutch operated synchronizing and shifting switch. The synchronizing connections thus will be open during the interval of employing the motor as a starting motor, or while the foot clutch is "in". Thus the synchronizing and shifting motor circuit will be closed when the clutch is "out" and opened when the clutch is "in".

Thus no additional mental or physical effort on the part of the operator will be required, and the method of selection will be similar to the conventional shift lever.

Various other objects and advantages of the present invention will be in part obvious from an inspection of the accompanying drawings and in part will be more fully set forth in the following particular description of one form of mechanism embodying my invention, and the invention also consists of certain new and novel features of construction and combination of parts hereinafter set forth and claimed.

The several figures are diagrammatic representations of conventional parts assembled to illustrate a preferred embodiment of the invention and showing stages of the moving parts.

In the drawings.

As the invention may be admirably embodied in an automatic engine starter mechanism in combination with a conventional blocker type gear synchronizing and shifting mechanism for automobiles it will be described in connection with such a device but it will be understood and readily appreciated that the invention is not so limited but may be utilized wherever manually controlled selective means is utilized to govern the co-operative actuation of different mechanical elements. In the following description and in the claims, parts will be identified by specific means for convenience of expression, but they are intended to be as generic in their application to similar parts as the art will permit.

In the drawings there is shown a conventional form of engine starter mechanism slightly modified to meet the requirements of the present disclosure, and including an electric motor 10 (see Figures 1 and 2), the armature shaft 11 of which is connected to a conventional self-operating self-starter mechanism including the threaded shaft portion 12, the axially movable gear 13 and the associated weight portion 15 together with the conventional spring member 15. The axially movable gear 13 is formed to engage the teeth 16 of the fly wheel 17 mounted on the engine shaft 18 as is usual in automotive construction.

As thus far described the construction embodies the basic features of well known makes of electric self-starters.

Figure 1:
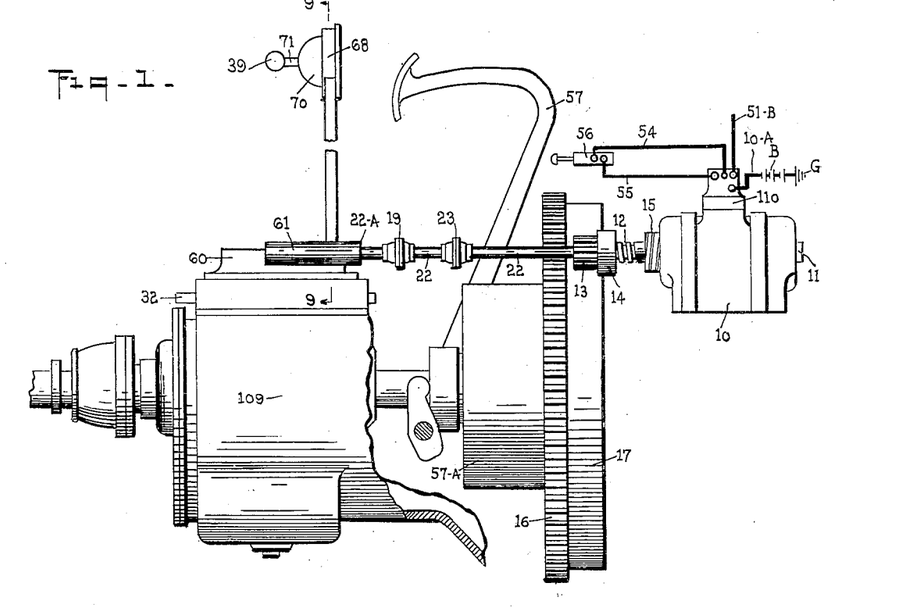
Figure 1 is an axial side elevation of the assembly of parts and the necessary connections required for an embodiment of the present invention.
Figure 2:
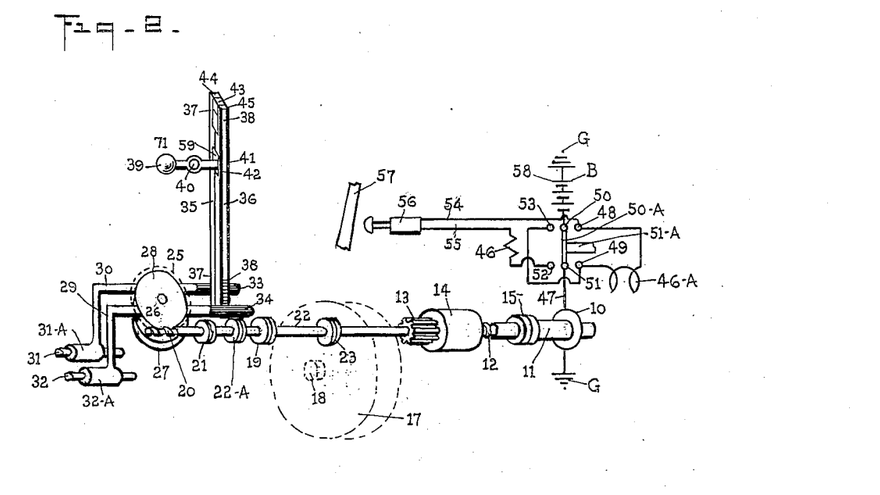
Figure 2 is an isometric presentation of the essential parts of Figure 1.

The shaft 11 is extended through a flexible coupling or mechanical equivalent to a worm gear 20 engaging an associated gear 25 mounted for rotation with the shaft 26. If the worm gear 20 is mounted for rotation by a rigid shaft 22 as shown by Figures 1 and 2 it is suggested that two flexible couplings 19 and 23 be inserted in the line of the shaft 22 and the unidirectional roller clutch 21 be also included in the line of shafting as hereinafter described.

A pair of cammed discs members 27 and 28 are shown fixed centrally to the shaft 26 so as to rotate therewith and are slightly spaced apart therefrom. One of these discs 27 is hereinafter referred to as the shifter disc member and the other disc 28 is hereinafter referred to as the neutralizer disc. These discs when rotated by the shaft 26 are designed to selectively actuate one of a plurality of speed gear control members 29 and 30 and an associated conventional blocker type synchronizing mechanism (not shown), but it is to be understood that any selective speed change mechanism and any number of these control members may be actuated from the shaft 26 by the addition of pairs of discs as 26 and 27 or their equivalent. The shiftable members 29 and 30 may constitute the conventional shift rods or they may be securely fastened to the conventional shift rods 31 and 32 forming a portion of a conventional power transmission mechanism preferably equipped with a conventional blocker type synchronizer for each transmission gear moved by same. These shiftable rods 31 and 32 are intended to represent the said means (not shown) for synchronizing and shifting the gears in the transmission box 109 as commonly used on vehicles to obtain the different speeds. These conventional and well known parts have been omitted in order to simplify the drawings.

The shiftable control members 29 and 30 are provided with rockable toothed portions 33 and 34 operatively associated with the reciprocating manually actuated selector rods 35 and 36 at the rack portions 37 and 38. The rack portion 37 engages the toothed portion 33 of the control member 30, and the rack portion 38 engages the toothed portion 34 of the control member 29 so that the racks will continue in mesh with the toothed portions as the portions 33 and 34 are rotated as the rods 35 and 36 are moved from and to a neutral position.

A manually actuated control handle 39 is mounted for universal movement on the universal support member 40 and is formed to end in a selective actuator end portion 41 normally resting in the opening formed in the cut-away portions 42 and 59 of the interlock extension portions 37 and 38 of the selector control rods 35 and 36. The movable reduced portions 37 and 38 are positioned relative to the stationary interlock portion 43 so that the interlocking balls 44 and 45 (Figure 11) forming a portion of a conventional shift rod interlock will act to hold the selector rods 35 and 36 in a given shifted position.

The conventional foot clutch lever 57 when moved out is intercepted by a motor circuit closing switch 56 connected to a modified conventional self-starting control station 110 including the reversing switch terminals 48 to 53 inclusive (Figure 2.)

The contacts 50 and 51 are arranged to be moved from the contacts 52 and 53 to the contacts 48 and 49 when actuated by a conventional automatic or remote control means to normally employ the motor 10 to rotate in one direction as a starting motor. It is suggested that the uni-directional clutch member 21 be of the well known clutch roller type so arranged as to rotate the shaft 22 when the armature shaft 11 rotates in a direction opposite to its direction of rotation when employed as a self-starter motor to rotate the fly wheel 17, and to automatically disconnect the shaft 22 from the armature shaft 11 when the armature shaft 11 rotates in its normal self-starting direction.

For the purpose of the present disclosure let it be assumed that the armature shaft 11 rotates counter-clockwise (when viewed from the left of Figures 1 and 2) when rotating as a starting armature shaft and clockwise when operating as a synchronizing and shifting armature shaft.

Thus the shaft 22 will only be rotated when the shaft 11 rotates clockwise and the gear portion 25 of the disc 27 and thus the shaft 26 will be rotated in a direction determined by the travel of the worm gear 20.

Figure 3:
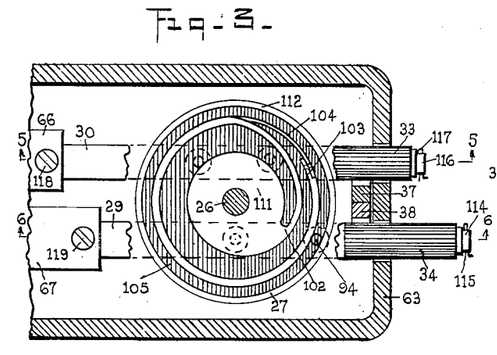
Figure 3 is a side transverse sectional view in elevation of the shifter cam disc.
Figure 4:
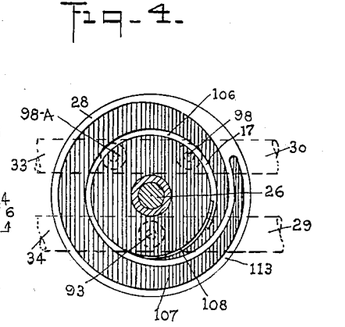
Figure 4 is a side transverse sectional view in elevation of the neutralizer disc after being turned 180°.
Figure 7:
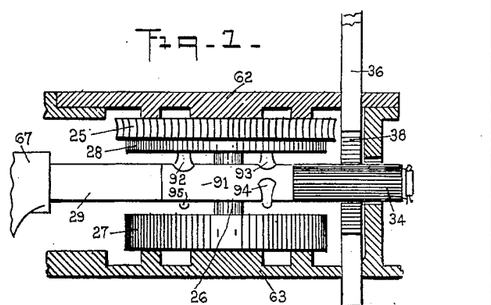
Figure 7 is a side elevation view of the discs showing the shift rods and the selector projections.
Figure 8:
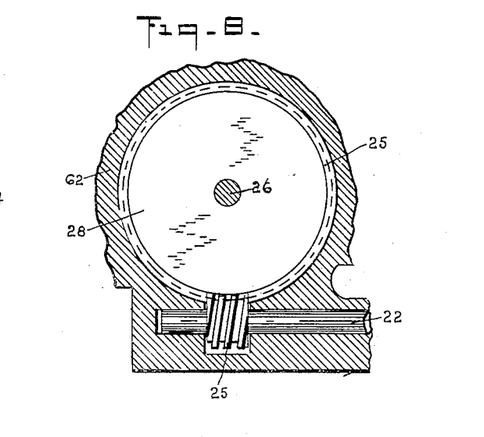
Figure 8 is a top view of the worm and gear driving means for the discs of Figure 7.

Let it be assumed for the purpose of this description that the shaft 26 is rotated clockwise as viewed from the top of Figure 7 (also see arrows of Figures 3 and 4). The discs 27 and 28 are fixed centrally to the shaft 26 so as to rotate clockwise therewith and are slightly spaced apart thereon. One of the said discs, 27, hereinafter referred to as the synchronizing and shifting disc, has a circular projection 111 with its center at the axis of rotation of the shaft. This projection is in the form of a small circular disc projection from the side of the shifting disc facing the other disc. The periphery of this circular projection provides a bearing or guiding wall which leads to a spiral portion of a flange 102 which spiral portion extends from one edge of the projection 111 and evolves outwardly in an anti-clockwise direction to form a volute bearing surface, the free end 103 of the flange 102 being approximately circular for about 250°.

Figure 5:
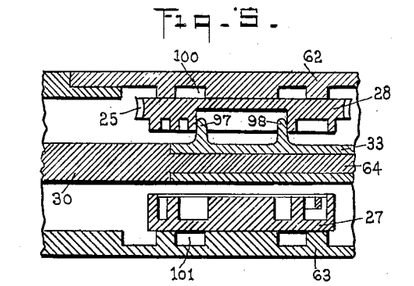
Figure 5 is a sectional view in axial elevation of the two discs when mounted about a common axis and taken along the line 5—5 of Figure 3.

The synchronizing and shifting disc 27 is outlined by a peripheral flange 112 spaced from the circular portion of the flange 111 a distance sufficient to form a groove 105 designed to accommodate therein one end of a clutch element (see Figures 5 and 7) hereinafter described.

The free end 103 of the flange 102 has an outwardly opening curved gate 104 with one end fixed thereto and forming a continuation thereof with the free end meeting the flange 102 adjacent the juncture of the spiral and circular position thereof. This gate preferably is in the form of a curved leaf spring, one end of which is attached as by means of flush rivets to the flange.

The other disc, 28, hereinafter referred to as a neutralizer disc, has an outlining peripheral flange 113 similar to and projecting toward the flange 112 of the shifting disc 27, and leading from the inner wall of the flange 112 is an inwardly curving clockwise spiral flange 107, the inner end of which is formed into a substantially closed annular band 17. An inwardly opening curved gate 108 similar to the gate 104 forms a continuation of the annular band 17 so as to form a closed interior circular bearing surface on the inner side thereof concentric with reference to the axis of rotation of the shaft 26 (Figure 4). The interior bearing surface on the neutralizer is disposed opposite the exterior circular bearing surface on the projection 11 of the shifting disc 27, but has a diameter greater than the diameter of the said disc projection so as to accommodate the selected clutch element which may be projected into engagement with either bearing surface.

The two discs are designed to actuate one of a plurality of control members two of which are herein described, but it is to be understood that any number of these members may be actuated from one shaft. Two of these said control members 29 and 30 are shown in the form of control rods and are intended for the purpose of the present description to represent means for actuating the conventional shift fingers (not shown) for synchronizing and shifting the selective gears in the transmission box 109 as used on automotive vehicles to obtain the different forward and reverse speeds.

Considering any control member, as for instance the rod 29 controlling the low and reverse speed synchronizing, shifting and neutralizing, it will be noted by reference to Figure 7 that one end thereof is positioned between the discs and is formed with a reduced bearing portion 65 (see Figure 6) to rotatably receive and support a toothed portion 34 secured in axial position by a washer 114 and a cotter pin 115. The member 30 is also formed with a reduced bearing portion 64 (see Figure 5) to receive a toothed portion 33 held in axial position as it rotates about the portion 64 by the washer 116 and the cotter pin 117. The control members 29 and 30 are connected to the gears of the transmission through the connecting members 66 and 67 adjustable as mounted on same by means of the set screws 118 and 119. If the particular requirements of the vehicle upon which the device is installed and operated necessitate intervening control members, additional control members such as 31 and 32 of Figure 1 may be employed.

The rotatable toothed portions 33 and 34 of the control members 29 and 30 also include portions 91 (see Figure 7) having a plurality of radially extending sets of projecting selector arms 93 and 94, 92 and 95, formed integral with the section 91 of toothed member 34. The selector arms 96 and 98, 96—A and 97 are formed integral with the portion 91—A of the toothed member 33. These selector arms are formed in sets so that one arm will act as a neutralizer when moved so as to extend into the grooves in the neutralizing disc 28 (see Figure 9) with a rotation of the toothed portion in one direction, and the mating arm will extend into the grooves of the shifting and synchronizing disc 27 when the toothed portions are moved from a neutral position in the opposite direction.

The said pairs of selector arms are positioned about 120° apart, the arms 93, 92, 97 and 98 being the neutralizing arms, and the projections 94, 95, 96 and 96—A are the shifting and synchronizing arms. The sets of arms are of such a radial length as to cause one of the arms to be free just before and after the mate is engaged in the groove on the opposite disc. The neutralizing arms are normally positioned in the groove of the neutralizing disc 28. The toothed portions 33 and 34 are selectively actuated to and from a neutral position by the racks 37 and 38 forming a portion of the manually actuated control rods 35 and 36 (see Figures 1, 2, 3, 9, 10 and 11) positioned for reciprocatory movement in a guide portion 63—A formed in the casing 63, and positioned back to back to move within the enclosure 63—B leading the control rods to a manually actuated control station shown in Figures 10, 11 and 12. The wall or enclosure is attached to the casing 63 by means of the screws 63—C. When the screws 63—C are removed the members 35 and 36 may be removed for inspection together with the enclosure 63—B from within the casing portion 60.

It should be noted at this time that the rockable toothed portions 33 and 34 move axially relative to the axially stationary reciprocating racks 37 and 38.

The enclosure casing portion 63—B is connected to a control station base 68 (see Figures 10 and 11) by means of the screws 75. This control station may be attached to the conventional vehicle dash in any position convenient to the operator of the vehicle. The actual length of the selector rods 35 and 36 and the enclosing member 63—B will of course be varied in accordance with the requirements of the vehicle upon which the present device may be installed and operated. It is also true that any known method of transmitting power for operating from the members 35 and 36 to the toothed members 33 and 34 may be employed without departing from the spirit of my invention.

The reciprocating selector members 35 and 36 are formed with cut-away portions 59 and 42 resembling the usual and conventional shift lever interlock shift finger portions. These cut-away portions 59 and 42 are normally opposite each other when the transmission mechanism is in a neutral status as isometrically shown in Figure 2 to receive the actuating end 41 of the manually actuated lever 71 provided with the handle 39. The lever 71 is universally mounted in the universal socket portion 90 of the plate 73 attached to the control station cover casing 69 in turn secured to the control station base 68. The selecting members 35 and 36 are securely attached to extension members 81 and 82 by means of the pins 90 and 91. The extension members 81 and 82 are formed with interlocking depressions 83, 84, 85, 86, 87 and 89 to receive the interlocking balls 44 and 45 of the stationary interlock member 88. This transmission interlocking system is of the conventional form and may be considered for the purpose of this description as a duplicate of the interlock mechanism conventionally used with the shift rods 31 and 32 moving in the cover 60 of the transmission casing of Figure 1.

Thus the present organization is provided with two similar interlocks co-operatively associated through the selector members 35 and 36. The handle 39 will be operated in a manner similar to the manner of operating the conventional shift lever handle as may be seen by reference to Figure 12. The curved cover 70 is provided with cut-out guiding slots collectively forming in general a capital H. Moving the handle upward in the slot portion 76 will place the said handle in the (R) or reverse speed position, moving the handle downward in the slot 76 and thence downward in the slot 79 will place the handle in the (L) or low speed position.

Figures 10, 12:
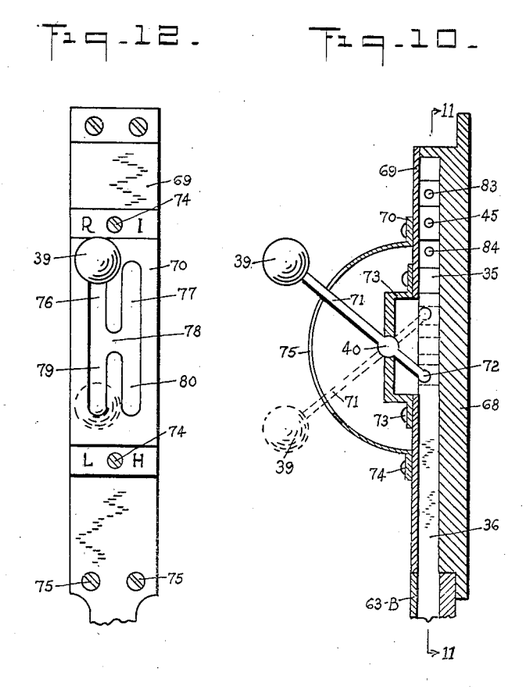
Figure 10 is a vertical sectional view of the control station means showing the control lever in reverse speed position, taken along the line 10—10 of Figure 11.
Figure 12 is a front view of the control station showing the control handle in an operative position.

The bar slot portion 78 is of course the neutral position of the handle 39. Moving the handle 39 upward in the slot 77 will place same in the (I) or intermediate speed position, and moving the handle 39 downward in the slot portion 80 will place the same in the (H) or (D) speed (direct) position.

In operation, let it be assumed that the engine shaft 18 of Figure 2 is still. Now let it be assumed that the motor 10 is energized by the operator of the vehicle by stepping on the usual starter button, turning on the ignition, or by any other known method of supplying starting current to the motor 10 to act to rotate the armature shaft 11 of same counter-clock-wise as a starting motor. By any of these methods the contacts 50 and 51 will be moved into electrical circuit relation with the contacts 52 and 53. As the armature shaft 11 rotates counter-clock-wise the gear 13 and the weight 14 will be moved to the left by such rotation so as to mesh the gear 13 with the teeth 16 of the flywheel 17 to fire the engine to rotate the engine shaft 18 relatively faster than the gear 13 to act to move the gear 13 on the thread 12 and out of mesh with the teeth of the wheel 17 which action is well known in the art of self-starting systems as well as the action of the shock absorbing action of the spring 15.

With the vehicle engine running and the self-starting gear 13 free of the fly-wheel 17 the operator elects to obtain low speed driving relations between the gears (not shown) of the transmission mechanism installed in the box 109 of Figure 1. Accordingly the operator moves the control handle 39 of Figure 12 from the neutral guide slot 78 to the left and thence downward in the slot 79 to the handle position shown in dotted outline on Figure 12.

Figure 9:
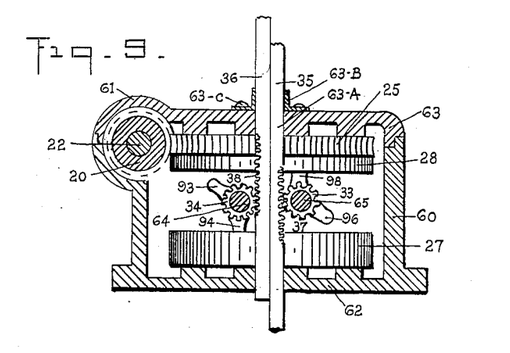
Figure 9 is a side view partly in section taken along the line 9—9 of Figure 1.
Figure 11:
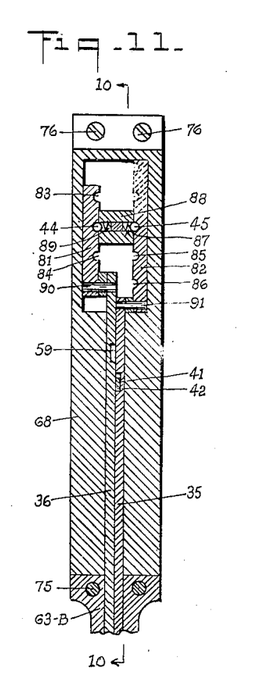
Figure 11 is a sectional view in elevation taken along the line 11—11 of Figure 10 showing the details of the interlocking mechanism.

Such manual control action of the handle 39 causes the lever finger 72 to move the control rod member 36 upward as shown in Figure 9 (remembering that Figure 9 is viewed from the left of Figure 1, and Figure 11 from the right). This action will move the rack portion 38 upward and thereby rotate the toothed portion 34 of the reduced shift rod portion 65 on the rod 65 with a counter-clock-wise motion. This motion will move the radially extending selector element 93 out of the neutralizing slot of the disk 28, and the selector 94 into the shifting and synchronizing slot of the shifting disk 27. Normally the contacts 48 and 50 of the remotely controlled starting switch are in electrical contact as are also the contacts 49 and 51 (the motor shifting circuit is always open at the clutch switch 56 when the clutch 57 is "in").

Accordingly when the foot clutch member 57 is pushed by the operator to the right to an "out" position, the switch 56 will be closed and the current supply through the motor will be closed through the resistance element 46 so as to rotate the armature shaft clock-wise (as viewed from the front) in a manner well known and accepted in the art. As the current supply to the motor is limited by the restricting action of the resistance 46 the shaft will rotate clock-wise at a lower speed than it rotated counter-clock-wise as a starting motor shaft.

With the motor shaft rotating clock-wise the unidirectional clutch member 21 will now function and the shaft portions indicated by the numeral 22 will be rotated clock-wise therewith to rotate the worm gear 20 and therethrough the toothed disc 28, the shaft 26 and the disc 27 clock-wise.

Figure 6:
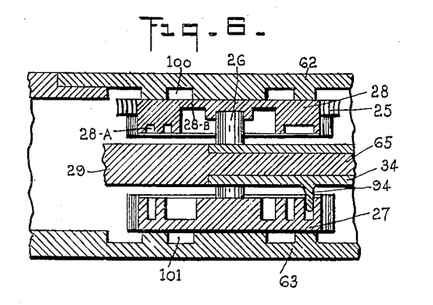
Figure 6 is a sectional view in axial elevation of the two discs when taken along the line 6—6 of Figure 3.

With the selector 94 of Figures 3 and 6 in the shifting groove of the disk 27 as the shaft 26 starts to rotate clock-wise the control rod 29 will be moved by the motor shaft 11 (through the said connections) to the right as the selector 94 is actuated by the guiding wall 102 to the fully displaced position as shown in Figures 3 and 6.

In the conventional blocker type synchronizing devices a deterrent action is provided by the elements of same to act to cause frictional synchronizing surfaces to be pressed together whereby power is transferred from one to the other until both are rotating at approximately the same speed. Thus when the present device is employed with transmissions equipped with gear synchronizing devices a resistance will be offered to the initial axial movement of the rod 29 to the right. Thus the motor shaft 11 will be subjected to high torque load resistance during the synchronizing interval, especially in view of the well known blocker action which will prevent the shift rod 29 to move appreciably until synchronization of the gears is effected, or approximately effected.

Now, it is true that conventional starting motors for automotive engines are series-wound machines, designed to produce high torque at low speed. Characteristic curves indicate the torque to be a maximum at zero speed, where of course the current drawn is a maximum. Both torque and current fall off rapidly with increase in speed. Thus the gear synchronizing action may be accomplished with the motor at approximately zero speed, and when the blocker element moves out of the path the motor will speed up to shift the synchronized gear into operative position.

Thus the conventional starting motor is peculiarly adapted for synchronizing and shifting use due to its inherent characteristics. If a shock-absorber is required in some installations because of the operating conditions between the motor shaft 11 and the selector elements (as element 94 of Figure 6) a conventional giveaway frictional clutch or a resilient member 22—A may be placed in the line of shafting 22.

As the starting motor brushes are set for normal counter-clock-wise rotation of the armature, the motor will not be as efficient when operating in the opposite direction as a synchronizing and shifting motor. But the power required for synchronizing and shifting is less than the power required for starting, and even with the loss in efficiency and thus power the motor will still be of greater capacity than required. In fact the current limiting resistance 46 of Figure 2 is actually included in the motor circuit organization to reduce the capacity of the motor. Furthermore the brushes may be adjusted to meet the peculiar requirements under which the device is installed and operated.

With the shift rod 29 moved to the extreme right as shown in Figure 3 the transmission mechanism included in the transmission box 109 will be in low speed driving relation. The motor 10 may still be rotating and also the shaft 26. But there will be no further axial movement to the rod because the selector is now in the circular portion of the guide 105 of the shifter disk 27. It should be noted that the foot clutch may be held out as long as desired after the shift has been made, without affecting the shifted gear, and in addition there will be no load on the motor. Eventually the operator will let "in" the clutch 57. The circuit will be opened and the motor 10 will stop. The angular position of the discs 27 and 28 at any time is immaterial.

Now let it be assumed that the operator of the vehicle wishes to return the transmission gears to neutral. In this event the operator will move the handle 39 (see Figure 12) to the neutral slot 78, and the manually actuated shift lever 71 acting through its end finger portion 72 will move the selector rod 36 downward to rock the toothed portion 34 clock-wise (as viewed in Figure 9) to move the selector element 94 out of the groove of the shifting disk 27 and thence the selector element 93 into the neutralizing disk 28. As the operator is moving the transmission out of low speed it may be assumed that the vehicle is moving forward with the clutch 57 still "in", the switch 56 still open, and the motor still. After the operator moves the handle 39 to the neutral slot, the foot-clutch will be moved to the "out" position, the switch 56 closed and the motor rotated clockwise; (or the clutch 57 may be moved to "out" position before the handle is moved to the neutral slot 78, depending on the habit or wish of the operator). In either event the discs 27 and 28 are rotated clock-wise.

It should be noted that the depth of the guiding groove portion 28—A of the neutralizing disc 28 is not as deep as the groove portion 28—B. The groove portion 28—A is just deep enough to permit the selector elements 92, 93, 97 and 98 to ride in the same and move the rods 29 and 30 to and from a neutral position, but not deep enough to permit the toothed portion (as 34) to be fully rotated on its bearing to the extent to move the handle 39 completely to the neutral slot 78 of Figure 12 until the rod 29 has been moved toward neutral position sufficiently to bring the selector 94 to the region of the groove portion 28—B. When the selector 94 reaches the portion 28—B it may be fully rotated and thus the associated rack and the control handle 39 may be fully moved to the neutral slot 78 of Figure 12.

With this interlocking feature of the groove portions of the neutralizing disc 28, it will not be possible to move the handle 39 from the low position to the other positions I, R and H through the neutral position until the low gear is in neutral position. In fact, the operator will be able to feel this action in the handle 39, and will thus be advised that the gear has been returned to neutral. Ordinarily the gear will be returned quicker than the operator can move the handle. Thus the low gear is now in neutral position. If the operator is going to stop the vehicle, he will let in the foot-clutch 57 and the motor 10 will come to rest. If the operator intends to shift to some other speed driving relation, as for instance "reverse speed", he will continue to hold the foot-clutch "out" and move the handle 39 upward to the R position as shown in Figure 12.

With this motion the lever portion 72 will be actuated to push the control selector member 36 downward to cause the rack portion 38 to rotate the toothed portion 34 clock-wise from a neutral position. The portion 91 forming a part of the portion 34 will also be rotated clock-wise as also will the selector arms 92, 93, 94 and 95. The arms 92 and 93 will be moved away from the neutralizing disc 28 (see Figure 7). The arm 94 will be moved relatively away from the shifting disc 27 and the arm 95 will be moved into the shifting groove of the disc 27. If the foot-clutch 57 is still "out" the motor armature shaft 11 will still be rotating clock-wise as hereinbefore described. The rod 29 will thus be moved to the left to first move the reverse gear portions in the transmission against the synchronizing means and finally to its meshed reverse speed driving position.

Similar operations of the foot-clutch 57 and the control handle 39 in the slots 77 and 80 of Figure 12 will act to effect intermediate and direct speed driving conditions in the transmission box, except the rod 30 will be moved to and from a neutral position.

If the operator elects to shift from low to intermediate speed the handle 39 will be moved from the L position of Fig. 12 to the I position. Normally the foot-clutch will be held "out" during this movement in the same manner as is usual in conventional shifting. The rod 29 will first be moved from its operative position shown in Figure 3 to its neutral position, and then the rod 30 will be moved from its neutral position to its operative position to move intermediate gear to a shifted position. But the rod 30 cannot be moved from a neutral position until the rod 29 has been returned to its neutral position, as hereinbefore described due to the checking action of the groove portions 28—A and 28—B of the neutralizing disc 28. Similar action will take place in shifting from H position to L position. In a normal operation of the device, there will be no delay in moving the control handle, because the motor 10 may be connected to the shaft 26 so that the movement of the rods will be as fast as the operator's hand.

According to the present disclosure the shiftable gears (not shown) of the transmission can only be moved axially a definite distance, and this distance will be determined by the cams of the discs 27 and 28. Such an arrangement eliminates any necessity for limiting the angular motion of the shaft 26 and thus the angular motion of the armature shaft 11. If the motor continues to rotate the two discs 27 and 28, such rotation can have no effect on the shiftable gears of the transmission when shifted or in neutral.

The foot-clutch may be operated at will as in the usual conventional manner when a gear driving relation has been effected, or with the transmission in neutral. The vehicle may be parked in gear without any danger of the gear coming out of gear mesh as the shifting disc is at rest.

Any desired axial movement may be imparted to the moving gears as they are shifted to and from a neutral position by proper design of the involute and evolute cams of the discs 27 and 28.

All of the parts within the transmission enclosures 60 and 109 are continually accessible to the transmission oil or grease as usually placed in the transmission box 109 and thus no oiling problems are presented. Even the control station parts may be oiled by lubricant drawn up between the members 35 and 36.

As the discs 27 and 28 are rotated a comparatively short time at low speed ordinary bearings have been shown. These bearings may be modified to meet the requirements under which the device may be installed and operated.

The motor 10 may be instantly operated as a starting motor even with the foot-clutch "out" because the movement of the reversing switch terminals 50 and 51 to the terminals 52 and 53 will act to close the motor circuit to cause the motor to be operated counter-clock-wise independently of the status of the foot-clutch 57.

If the engine stops in gear the foot-clutch 57 will have to be held out in the same manner that it would have to be held out with the conventional shift lever with the engine stalled.

If the control lever handle 39 is moved toward neutral (or to a shifting position) before the discs move the rods 29 and 30, (as the engine stalls) as hereinbefore described, the engine may be started in the usual manner. This is true, because the control for starting will move the control switch contacts back to the normal starting position and the motor will first rotate counter-clock-wise to start the engine, and then (foot-clutch still out) it will be rotated clock-wise to clear the shifting mechanism.

Methods of making certain parts adjustable have been omitted in order to keep the drawings as simple as possible. For example the foot-controlled switch 56 may be mounted adjustable relative to the foot-clutch lever 57 so that the amount of foot-clutch throw required to operate the switch 56 will vary. If it is desired to require the operator to move the clutch-lever fully out in order to close the switch 56, then the said switch will be moved to the right. If it is desired to cause a small movement of the foot-clutch to operate the switch, then the said switch will be moved to the left. Thus in normal operation of the vehicle, the motor 10 would not be energized for slight movements of the foot-clutch. In fact the switch 56 could be installed so that only a full movement of the clutch to the right would close the said switch.

In addition, the selector rods 35 and 36 may be provided so as to be adjustable in length. The switch 56 could have been shown included in the circuit organization so as to be operated manually by hand and thus indepedently of the action of the foot-clutch 57. The selector members 35 and 36 could of course be arranged for rotation by a non-reversible worm-gear arrangement, so as to prevent any reaction between the shift rods and the selectors as 94 being transmitted to the control lever 39.

Thus, while I have shown and described and have pointed out in the annexed claims certain novel features of my invention, it will be understood that certain well known mechanical equivalents of the elements illustrated as well as electrical equivalents may be used, and that various other substitutions, omissions and changes in the form and details of the device illustrated and in its operation may be made by those skilled in the art without departing from the spirit of the invention which is indicated in the following claims.

Having thus described my invention, I claim:—

1. In a device of the class described, the combination with a reversible power member, a gear rod shifting mechanism and a driven device, said mechanism including a pair of cammed discs for selectively shifting said rod in two directions, and means for selectively coupling the power member with the shifting mechanism to rotate the discs or the driven device as an automatic effect of the reversal of the said member.

2. In a device of the class described, the combination of an electric motor adapted normally to undirectionally drive an engine starter at relatively high speed, a gear shifting mechanism including a resiliently connected shaft, involute and evolute cammed elements actuated by the said shaft, a plurality of shift rods and a unidirectional clutch for connecting said mechanism with the said motor so as to be driven thereby, a resistance element, means for electrically introducing the said resistance into the motor supply circuit to cause the motor to rotate at relatively low speeds in one direction while actuating the said cammed elements of the said mechanism, and further circuit means actuated by the said automatic control independently of the resistance introducing means for electrically removing the said resistance from the motor circuit to thereby cause the said motor to rotate at its normal high speed in the opposite direction so as to act as an engine starter motor.

3. In a device of the class described, the combination of a high speed electric motor, adapted to normally drive a device at a relatively high speed, a gear shifting mechanism including a pair of shift rods and a pair of cammed discs, rotatable means for selectively connecting either of the discs with either of the rods to move same in either of two directions, a unidirectional clutch for connecting said discs with said motor so as to be driven thereby, circuit means for introducing current into the motor circuit so as to employ the motor to rotate in one direction at a relatively low speed while actuating the said discs, and further circuit control means arranged to automatically supersede the first named circuit means for affecting the current supply to the said motor to reverse its direction of rotation and subsequently effect the driving connection of the motor with the said high speed device.

4. In a device of the class described, the combination of a relatively high speed electric motor, adapted to unidirectionally drive an engine starting device at relatively high speed, a gear synchronizing and shifting mechanism including a pair of cammed discs, a pair of shift rods each having a rotatable portion formed with projections selectively moved into operative relation with either of the discs, a unidirectional clutch for connecting said discs to said motor to be driven in one direction of motion thereby, a normally open foot clutch operated circuit control means for electrically introducing resistance into the motor circuit so as to cause the said motor to rotate at relatively low speed in said direction while actuating the discs and therethrough the selected rod of the said gear mechanism, and additional control means acting independently of the said first mentioned control means for removing the resistance from the motor circuit and to also employ the motor to reverse its rotation as a shifting motor, and further clutch means contolled by the said motor reversal for connection of the motor to the said high speed device.

5. In a device of the class described, the combination of a high speed electric motor, a reducing train normally and unidirectionally driven thereby, a gear shifting and synchronizing mechanism including cammed shift rod control elements, a first unidirectional clutch for connecting the motor with said gear train when rotating in one direction, a second unidirectional clutch for connecting the motor with the cammed elements of the mechanism when rotating in a relatively opposite direction, and a normally open vehicle clutch operated switch forming a portion of the motor circuit organization for affecting the direction and magnitude of the current supply to the said motor when closed thereby to employ the motor to rotate in a direction to operate the said cammed elements.

6. In a device of the class described, the combination with an engine starter provided with a reversible power element normally connected to start the engine when rotating in one direction, of a gear synchronizing and shifting mechanism provided with shift rods, evolute and involute cammed means for connecting either of said rods of the said mechanism with the power element as said element is controlled to rotate in a relatively opposite direction, and a remote manually actuated control means for initiating the connection of either of the cammed means with either of the rods.

7. In a device of the class described, the combination with a synchronizing and shifting mechanism and a remotely positioned selective control means therefor, said mechanism including an evolute cammed disc and an involute cammed disc and associated shift rods, a foot operated engine clutch, means collectively constituting an electric circuit including a reversible motor for actuating the said discs and thereby the rods when rotating in one direction and the engine when rotating in the relatively opposite direction, a normally open shifting control switch associated with the said circuit and said foot clutch, two unidirectional clutches arranged for automatic co-operation with the said motor, said remote control and said shifting switch for effecting the selective connection of the motor with either of the discs and either of the rods or the engine.

8. In a device of the class described, the combination of a motor normally inactive, initially acting with relatively slow starting speed, a gear shifting device including evolute and involute cammed gear shifting elements normally connected to the said motor and actuated thereby at the relatively slow starting motor speed in one direction only, an engine shaft provided with means for connecting same to the motor to be driven at relatively high speed in the opposite direction, and associate control means for sequentially reversing the motor, disconnecting the cammed elements of the gear shifting device from the motor and thence connecting the engine shaft means with the motor.

9. In a device of the class described, the combination of a selectively controlled blocker type gear synchronizer and shifting mechanism including shift rods and associated cammed rod actuating elements, a reversible power means normally having relatively low torque in one rotating direction for actuating the said cammed elements and selectively therethrough the said rods, said rods each including a selectively rotatable portion with radially extending fingers formed to co-operate with said cammed elements, an engine shaft, means for selectively increasing the relative torque of said power means and to also employ the said power means to rotate in the opposite relative direction, and means for automatically connecting the said power means to the engine shaft after it has started to rotate in the said opposite direction.

10. In a device of the class described, the combination with an engine starter provided with a rotatable power element normally connected to the engine starter when rotating in one direction, of a gear synchronizing and shifting mechanism including an actuating shaft mounted for rotatory movement, a pair of cammed discs spaced apart and fixed to said shaft to rotate therewith, a control rod disposed between said discs, a clutching element carried by said rod for connecting same at will with either of the said discs and simultaneously moving the same into an operative position relative to the other disc, one of the said discs being provided with means for co-acting with the said clutching means to move the rod in one direction and the other disc provided with means for moving the rod in the opposite direction, and remotely positioned manually selective means for operating the said clutch means, and means for connecting the said mechanism with the power element of the engine starter when same rotates in a direction opposite to its direction of rotation when acting as a starting motor.

11. In a device of the class described, the combination with a reversible power means, a gear shifting mechanism and a driven device, said shifting mechanism including a shaft mounted for reciprocatory movement, a two position clutch member carried by said rod, means co-acting with the said clutch member in one of its positions connecting said shaft to said rod to throw the rod in one direction and means co-acting with the said clutch member in the other of its positions connecting the said shaft and rod to throw the said rod back into its initial position, remotely positioned selective control means moving said clutch member into one of the said positions, and means for automatically coupling the power member either with the gear shifting mechanism or with the driven device as an automatic functional effect of the reversal of the said power member.

12. In a combined starting, synchronizing and gear shifting system, the combination with an electric motor, a starter member driven thereby according to the direction of rotation of the said motor, an engine shaft provided with a driven member, a gear synchronizing and shifting mechanism including two cammed discs facing each other and adapted to be rotated about a common driven member and in the same direction, the adjacent faces of each disc being provided with spiral bearing members, one of said members being involute and the other evolute relative to the direction of rotation of the discs, a control member positioned between said discs and mounted for longitudinal movement across the faces of said discs and connected to a slidable gear provided with synchronizing elements, a clutch member carried by said control member adapted to engage the spiral members to be shifted thereby, said clutch member being disconnected from one of the bearing members while in operative engagement with the other bearing member, a selective control for said clutch member, means for connecting the motor through the starter member with the engine shaft when said motor is rotating in one direction, and means for connecting the mechanism driven member with the said motor when the said motor is controlled to rotate in the opposite direction.

13. In a device of the class described, the combination of an electric motor, an engine shaft, means for connecting the motor with the engine shaft to drive the same when the said motor is controlled to rotate in one direction, a gear synchronizing and shifting control member including a shaft mounted for rotary movement, a pair of cammed discs spaced apart and fixed to said shaft to rotate therewith, a pair of gear control rods disposed between said discs and connected to movable gears, two clutching elements carried by each of the said rods for connecting the same with either of the said discs and moving the same into an operative position relative to the other disc, one of said discs being provided with means co-acting with the said clutching means to move a selected rod in one direction and the other disc being provided with means for moving the rod in the opposite direction, and remotely positioned interlocked selective means for operating said clutching means so that only one rod can be moved in one direction at a time, and means for connecting said shift control member with the motor to be actuated thereby when the motor is controlled to rotate in a direction opposite to its direction of rotation when connected to the engine shaft.

14. In a device of the class described, the combination with a reversible power member, a gear shifting mechanism and a driven device, said gear shifting mechanism including a cam faced disc mounted for rotary movement about a fixed axis, a gear control member extending across the face of said disc, a clutch member carried by the control member, and manually controlled selective means for moving said clutch member into engagement with the cam on the face of the disc whereby the revolving cam will act to shift the control rod, and means for selectively coupling the power member either with the gear shifting mechanism or with the driven devices as an automatic functional effect of the reversal of the said power member.

15. In a device of the class described, the combination with an engine starter provided with a rotatable power element normally connected to the engine when rotating in one direction, of a gear synchronizing and shifting mechanism including two discs facing each other and adapted to be rotated about a common axis and in the same direction, the adjacent faces of each disc being provided with spiral bearing portions, one of the said portions being involute and the other being evolute relative to the direction of rotation of the discs, a synchronizing and shifting control member positioned between said discs and mounted for longitudinal movement across the faces of said discs, a clutch member carried by said control member adapted to engage said spiral portions to be shifted thereby, being disconnected from one of the bearing portions while in operative engagement with the other bearing portions, manually actuated selective means operatively connected to said clutch portion to move the same from operative engagement with one of the disc bearing portions into operative engagement with the other disc bearing portion, and means for connecting said mechanism with the power element of the engine starter when same is controlled to rotate in the opposite direction.

16. In a device of the class described, the combination of an engine clutch, a change speed power transmission device including rotatable cammed gear shifting elements, an engine starter, a supplemental control means for said starter including a normally open engine clutch operated shifting control switch, said device including a gear synchronizing and shifting mechanism including selectively operated cammed element connecting means and a remotely positioned selective control therefor for employing said starter to shift the gears of the said mechanism from and to a neutral position when the said clutch operated switch is closed, and a unidirectional resilient driving connection between the starter and said mechanism whereby the starter control acts to govern the unidirectional actuation of the mechanism as a function of the operation of the said clutch.

17. The combination of an electric motor normally arranged for starting an internal combustion engine, means constituting a synchronized gear transmission device provided with shift rods and associated cammed actuators, and cooperatively associated mechanical and electrical means for controlling such engine starter and device to employ the motor to selectively rotate the actuators and shift a selected rod as a function of the direction of rotation of the said motor.

18. In a device of the class described, the combination of a movable element of an engine constituting a toothed fly-wheel, a normally open engine clutch operated switch, an engine starter provided with toothed means for connecting the said starter to the element to start the engine, a transmission gear synchronizing and shifting shaft unidirectionally connecting the engine starter to a shifting device, said shifting device to be rotated by the said starter upon the closing of the said clutch actuated switch, said shaft and said movable element being relatively associated with the starter so that the connection between the starter and shaft becomes inoperative automatically as the connection between the starter and the element becomes operative.

19. In a device of the class described, the combination of an engine clutch, a unidirectional engine starter, a power supply control therefor including a normally open engine clutch actuated switch, a selective gear synchronizing and shifting mechanism including rotatable cammed elements and reciprocating shift rods, and a unidirectional resilient driving connection between the starter and said cammed elements whereby the starter control and said switch governs the unidirectional rotation of the cammed elements as a function of the selective operation of the clutch, and a mechanical control for governing the selective movement of the rods by the actuators when same are rotated by the said starter.

20. In a device of the class described, the combination of an electric motor, an engine shaft, means for connecting the motor with the engine shaft to drive the same when the said motor is controlled to rotate in a given direction, means constituting the said control, a gear shifting mechanism including rotatable cammed actuating elements and reciprocating shift rods, said rods including a rotatable portion formed with radial extensions for selectively connecting the said elements and said rods, and means for unidirectionally connecting the said motor and cammed elements when the said motor is supplied with current by the said control so as to rotate in the opposite direction.

21. In a device of the class described, the combination of an electric motor, an engine shaft, axially movable means for connecting the motor with the engine shaft to drive the same during one direction of rotation of the motor and to also disconnect the motor, a reciprocating gear synchronizing and shifting control member including a rotatable selector portion, rotatable cammed means for connecting the selector portion of the member with the motor when the said motor is controlled to rotate in a relatively opposite direction of rotation, a torque limiting frictional clutch between the cammed means and the motor, a control for the said motor, and a plurality of unidirectional clutches automatically acting to cause one of the said connecting means to become operative as the other said connecting means becomes inoperative.

22. In a device of the class described, the combination with an electric motor and a normally inactive control therefor, a starting member unidirectionally driven by the said motor, a selective gear synchronizing and shifting mechanism provided with a driven member including cammed portions, a plurality of shift rods and a manually actuated selective control therefor, a control for said motor, and a plurality of unidirectional clutching means co-operating with the selective control and the said motor control for employing the motor to drive the engine shaft through the starter when driven in one direction according to the status of the said control and with the cammed portions when controlled to rotate in the relatively opposite direction.

23. In a device of the class described, the combination with a reversible driving member, a selective gear synchronizing and shifting mechanism including a plurality of reciprocating shift rods and a plurality of cammed rotatable actuator elements associated with the said rods, said elements unidirectionally connected to the said driving member to be rotated thereby to move the rods as the motor rotates in one direction, an engine starting member adapted to be connected to the motor member as it rotates in the relatively opposite direction, and a unidirectional clutch operative as a function of the directional rotation of the rotor for connecting the actuators with the motor as the starting member becomes inoperative upon the reversal of the motor.

24. In a device of the class described, the combination of a motor capable of operating at a relatively low speed in one direction of rotation and at a relatively high speed in the opposite direction, a frictional clutch, a gear shifting device including a plurality of shift rods and a plurality of rotatable cams selectively associated with the rods, said cams adapted to be unidirectionally connected to the motor through the said frictional clutch and actuated thereby at the relatively low speed, and further mechanism provided with means for unidirectionally connecting same to the motor so as to be driven at the relatively high speed in the relatively opposite direction, said connections automatically effected as a function of the directional rotation of the said motor.

HOWARD J. MURRAY.